(12) United States Patent
Klein (10) Patent No.: US 12,257,662 B2
(45) Date of Patent: Mar. 25, 2025

(54) LOCKING ACCESSORY FOR WOODWORKING SUPPORT

(71) Applicant: Magswitch Technology, Inc., Lafayette, CO (US)

(72) Inventor: Andrew Klein, Parker, CO (US)

(73) Assignee: Magswitch Automation Company, Superior, CO (US)

( * ) Notice: Subject to any disclaimer, the term of this patent is extended or adjusted under 35 U.S.C. 154(b) by 444 days.

(21) Appl. No.: 17/897,672

(22) Filed: Aug. 29, 2022

(65) Prior Publication Data

US 2023/0066083 A1 Mar. 2, 2023

Related U.S. Application Data

(60) Provisional application No. 63/239,067, filed on Aug. 31, 2021.

(51) Int. Cl.
*B23Q 3/06* (2006.01)
*B23Q 3/00* (2006.01)

(52) U.S. Cl.
CPC .............. *B23Q 3/069* (2013.01); *B23Q 3/005* (2013.01); *B23Q 3/06* (2013.01); *B23Q 2703/06* (2013.01)

(58) Field of Classification Search
CPC .......... B23Q 3/069; B23Q 3/005; B23Q 3/06; B23Q 3/102; B23Q 3/002; B23Q 1/285; B23Q 1/58; B23Q 5/34; B23Q 5/10; B23Q 2703/06; B23Q 16/001; B25B 5/003; B25B 5/006; B25B 5/08; B25B 5/10; B25B 5/104; B25B 5/109; B25B 5/166; B25B 5/163; B25B 5/068; B25B 11/02; B27C 5/06; B23D 47/04; B27B 5/10

USPC ........ 269/41, 45, 236, 71, 91, 92, 93, 94, 6, 269/238, 251, 252, 253

See application file for complete search history.

(56) References Cited

U.S. PATENT DOCUMENTS 7,815,178 B1 * 10/2010 Troutman ............... B25B 5/163
269/45
8,763,502 B2 * 7/2014 Smith ..................... B27B 25/10
83/13

\* cited by examiner

*Primary Examiner* — Robert F Neibaur
(74) *Attorney, Agent, or Firm* — Faegre Drinker Biddle & Reath LLP (57) ABSTRACT

Exemplary accessories for use with woodworking supports of woodworking devices may include a first number of locks actuatable by a second number of actuators, the second number being less than the first number. An exemplary actuator is a cam type actuator.

15 Claims, 8 Drawing Sheets

LOCKING ACCESSORY FOR WOODWORKING SUPPORT

RELATED APPLICATION

This application claims the benefit of U.S. Provisional Application No. 63/239,067, filed Aug. 31, 2021, titled LOCKING ACCESSORY FOR WOODWORKING SUPPORT, the entire disclosure of which is expressly incorporated by reference herein.

FIELD

The present disclosure relates to accessories for woodworking supports and in particular to accessories which are mounted to a woodworking support to guide and/or hold stock during an operation with the woodworking device associated with the woodworking support.

BACKGROUND

Exemplary woodworking supports include tables and rails of one or more woodworking devices, such as table saws, router tables, jointer tables, shaper tables, band saw tables and similar stock cutting machines. The exemplary woodworking supports often include a guide recess, sometimes referred to as a miter slots. Various accessories including jigs, miter gauges, featherboards, and others have a portion which is received in the guide recess and is altered to cause a friction fit with the guide recess to lock the position of the accessory relative to the woodworking support along the direction of the guide recess. It is known to have multiple individually actuatable locks on the portion that cause the friction fit to lock the position of the accessory relative to the woodworking support. Additional separately actuatable locks may also be provided to lock the accessory in a direction angled relative to the direction of the guide recess, such as an offset from a cutting device of the woodworking device, such as a saw blade, or shaping device of the woodworking device, such as a router bit.

It is with respect to these and other general considerations that embodiments have been described. Also, although relatively specific problems have been discussed, it should be understood that the embodiments should not be limited to solving the specific problems identified in the background.

SUMMARY

In an exemplary embodiment of the present disclosure, an accessory for a woodworking support having a support surface and a guide recess is provided. The accessory comprising a body adapted to be supported on the support surface of the woodworking support. The body having a bottom side and a top side, the top side being opposite the bottom side. The accessory further comprising a first lock adapted to be positioned in the guide recess of the woodworking support and a second lock adapted to positioned in the guide recess of the woodworking support. The first lock having an unlocked arrangement having a first width and a locked arrangement having a second width. The second width being greater than the first width. The second lock having an unlocked arrangement having a third width and a locked arrangement having a fourth width. The fourth width being greater than the third width. The accessory further comprising a mechanical actuator having an operator input positionable in a first position wherein the first lock is in the unlocked arrangement having the first width and the second lock is in the unlocked arrangement having the third width and a second position wherein the first lock is in the locked arrangement having the second width and the second lock is in the locked arrangement having the fourth width.

In an example thereof, the actuator simultaneously actuates each of the first lock from the unlocked arrangement to the locked arrangement and the second lock from the unlocked arrangement to the locked arrangement when the actuator is moved from the first position to the second position. In a variation thereof, the actuator simultaneously actuates each of the first lock from the locked arrangement to the unlocked arrangement and the second lock from the locked arrangement to the unlocked arrangement when the actuator is moved from the second position to the first position.

In another example thereof, the actuator simultaneously actuates each of the first lock from the locked arrangement to the unlocked arrangement and the second lock from the locked arrangement to the unlocked arrangement when the actuator is moved from the second position to the first position.

In yet another example thereof, the mechanical actuator includes a cam which actuates each of the first lock from the unlocked arrangement to the locked arrangement and the second lock from the unlocked arrangement to the locked arrangement when the actuator is moved from the first position to the second position.

In still another example thereof, the mechanical actuator includes a base, a first coupler coupling the first lock to the base at a first location, a second coupler coupling the second lock to the base at a second location, and a cam member rotatably coupled to the base at a third location, the third location being between the first location and the second location. In a variation thereof, the base is supported by the body and is vertically raised relative to the body when the first lock is in the locked arrangement and the second lock is in the locked arrangement. In another variation thereof, a movement of the cam member vertically raises the base relative to the body. In yet a further variation thereof, the cam member contacts the body when the first lock is in the locked arrangement and the second lock is in the locked arrangement. In still another variation thereof, the first lock includes a first slider and a second slider separated from the first slider by a first amount when the first lock is in the unlocked arrangement having the first width and by a second amount when the first lock is in the locked arrangement having a second width. In yet a further variation thereof, the first coupler includes a first portion positioned between the first slider and the second slider, the first portion of the first coupler having a first vertical position when the first lock is in the unlocked arrangement and a second vertical position when the first lock is in the locked arrangement, the second vertical position being closer to the body than the first vertical position. In still another variation thereof, the first coupler is adjustable to set a value for the second amount. In yet still another variation thereof, the first lock and the second lock are part of an integral slider. In a further still variation thereof, the body includes a first elongated slot and second elongated slot, the first coupler passing through the first elongated slot of the body and having a first end coupled to the first lock and a second end coupled to the base of the mechanical actuator and the second coupler passing through the second elongated slot of the body and having a first end coupled to the second lock and a second end coupled to the base of the mechanical actuator. In a further still yet variation thereof, the body is moveable relative to the base when the first lock is in the unlocked arrangement and the second lock is in the unlocked arrangement and is fixed relative to the base when the first lock is in the locked arrangement and the second lock is in the locked arrangement.

In a further example thereof, the accessory includes a featherboard.

In another exemplary embodiment of the present disclosure, a method of securing an accessory to a woodworking support having a support surface and a guide recess is provided. The method comprising: placing a first lock of the accessory in the guide recess, the first lock being in an unlocked arrangement; placing a second lock of the accessory in the guide recess, the second lock being in an unlocked arrangement; positioning a body of the accessory against the support surface of the woodworking support; positioning the accessory relative to a cutting device; and locking the accessory in place relative to the woodworking support with a single actuator that places both the first lock in a locked arrangement and the second lock in a locked arrangement.

In an example thereof, the accessory includes a featherboard.

In another example thereof, the step of positioning the accessory relative to the cutting device includes the steps of: moving the accessory relative to the cutting device along an axis of the guide recess; and moving the body of the accessory relative to the cutting device along a direction angled relative to the axis of the guide recess while the first lock and the second lock remain in the guide recess. In a variation thereof, the method further comprising the step of locking the body of the accessory in place relative to the woodworking support along the direction angled relative to the axis of the guide recess with the single actuator. In another variation thereof, wherein the steps of: locking the accessory in place relative to the woodworking support with the single actuator that places both the first lock in the locked arrangement and the second lock in the locked arrangement; and locking the body of the accessory in place relative to the woodworking support along the direction angled relative to the axis of the guide recess with the single actuator are performed with a first actuation of the single actuator.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1:
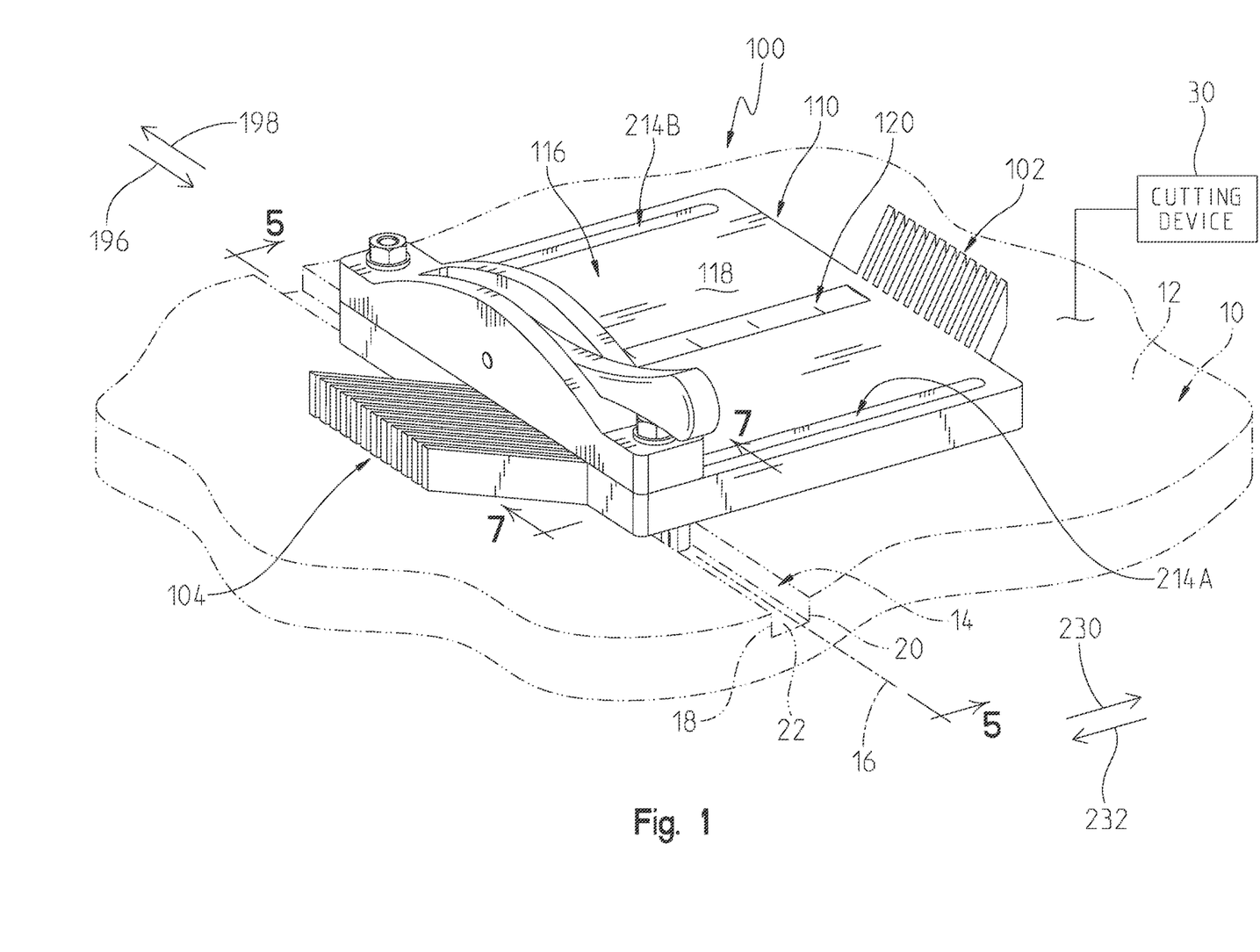
FIG. 1 illustrates a front perspective view of an exemplary accessory, a featherboard, supported on a woodworking support, the accessory being in a locked configuration relative to the woodworking support.

Referring to FIG. 1, an exemplary woodworking support 10 having an upper surface 12 is shown. Woodworking support 10 further includes a guide recess 14 which extends along an axis 16. Guide recess 14 includes a first side wall 18, a second side wall 20 and a floor 22 offset from upper surface 12 of woodworking support 10. Guide recess 14 has a generally constant cross-section along its length.

Woodworking support 10 further includes a cutting device 30 which is used to alter a shape of a workpiece (not shown), such as a piece of wood. Exemplary cutting device 30 include saw blades, router bits, drill bits, sanding or grinding wheels, and other suitable devices used to alter a shape of the workpiece. In embodiments, upper surface 12 of woodworking support 10 is a horizontal surface. In embodiments, upper surface 12 of woodworking support 10 is angled relative to horizontal.

Further shown in FIG. 1 is an accessory 100 supported on upper surface 12 of woodworking support 10. Accessory 10 is positionable on woodworking support 10 to hold or guide the workpiece relative to cutting device 30. Exemplary accessories include stops, featherboards, and other suitable devices to hold or guide the workpiece relative to cutting device 30. As shown in FIG. 1, the illustrated accessory 100 includes a first featherboard 102 and a second featherboard 104.

Figure 3:
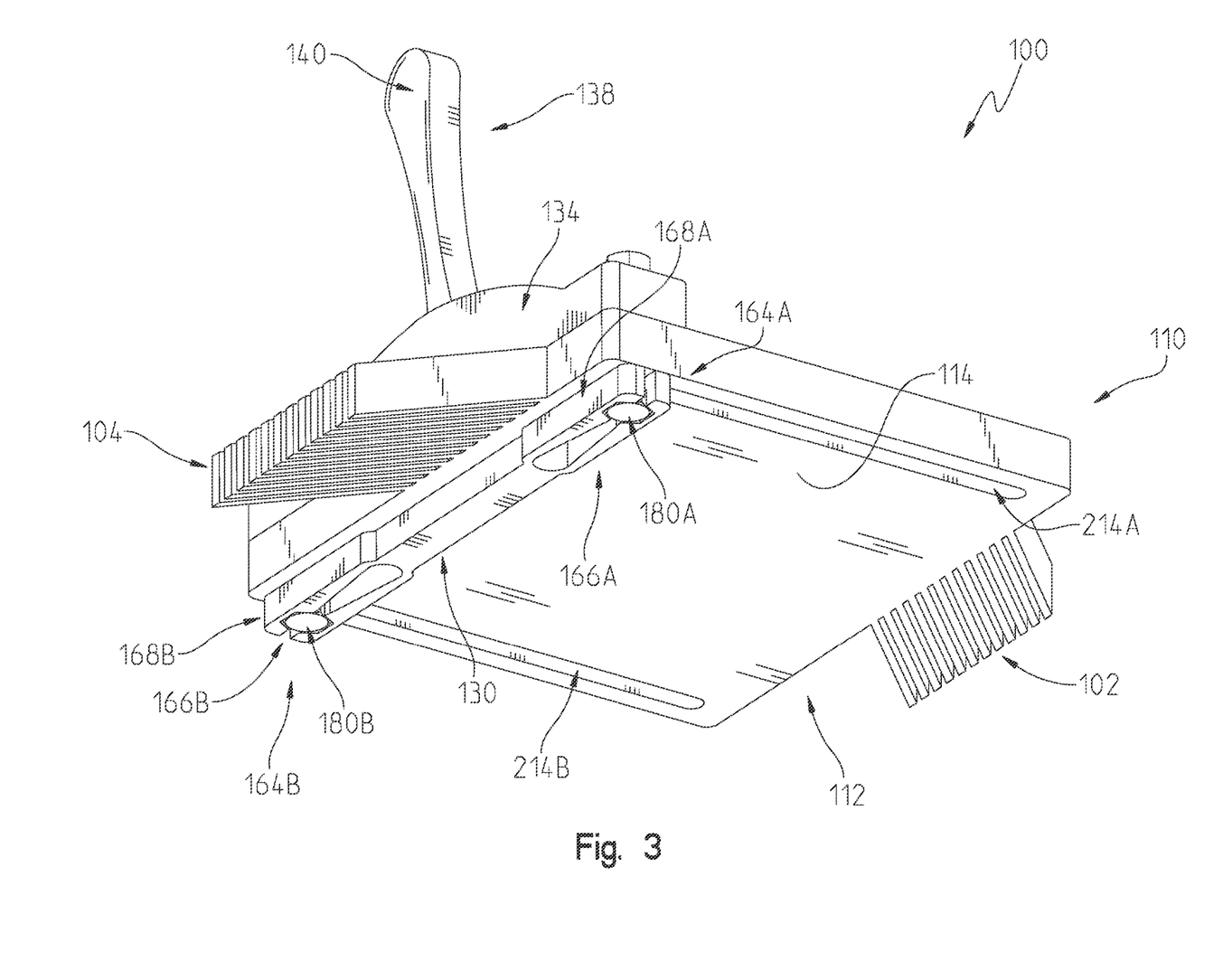
FIG. 3 illustrates a lower front perspective view of the accessory of FIG. 1.

Accessory 100 includes a body 110 adapted to be supported on upper surface 12 of woodworking support 10. Body 110 includes a bottom side 112 (see FIG. 3) having a planar surface 114 and a top side 116 having a planar surface 118 and a guide recess 120. Top side 116 is opposite of 112.

In embodiments, planar surface 114 of bottom side 112 is parallel to planar surface 118 of top side 116. In embodiments, planar surface 114 of bottom side 112 is angled relative to planar surface 118 of top side 116. Although each of bottom side 112 and top side 116 are shown having planar surfaces other arrangements are possible including cavities to reduce weight or provide strengthening ribs if body 110 is made of plastic.

First featherboard 102 and second featherboard 104 are both shown being integral portions of body 110. In embodiments, one or both of first featherboard 102 and second featherboard 104 are removably coupled to body 110.

Figure 4:
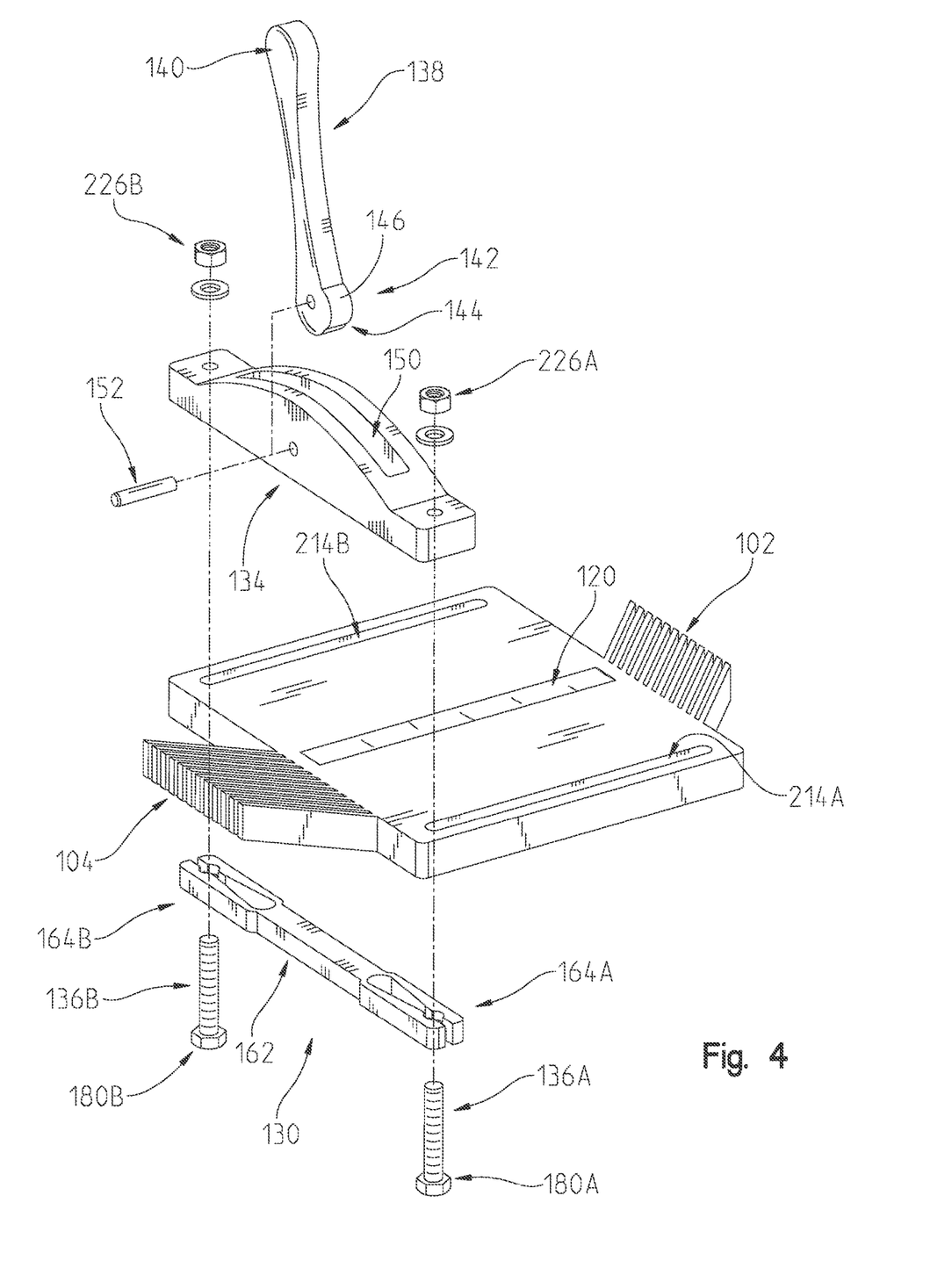
FIG. 4 illustrates an exploded view of the accessory of FIG. 1.
Figure 6:
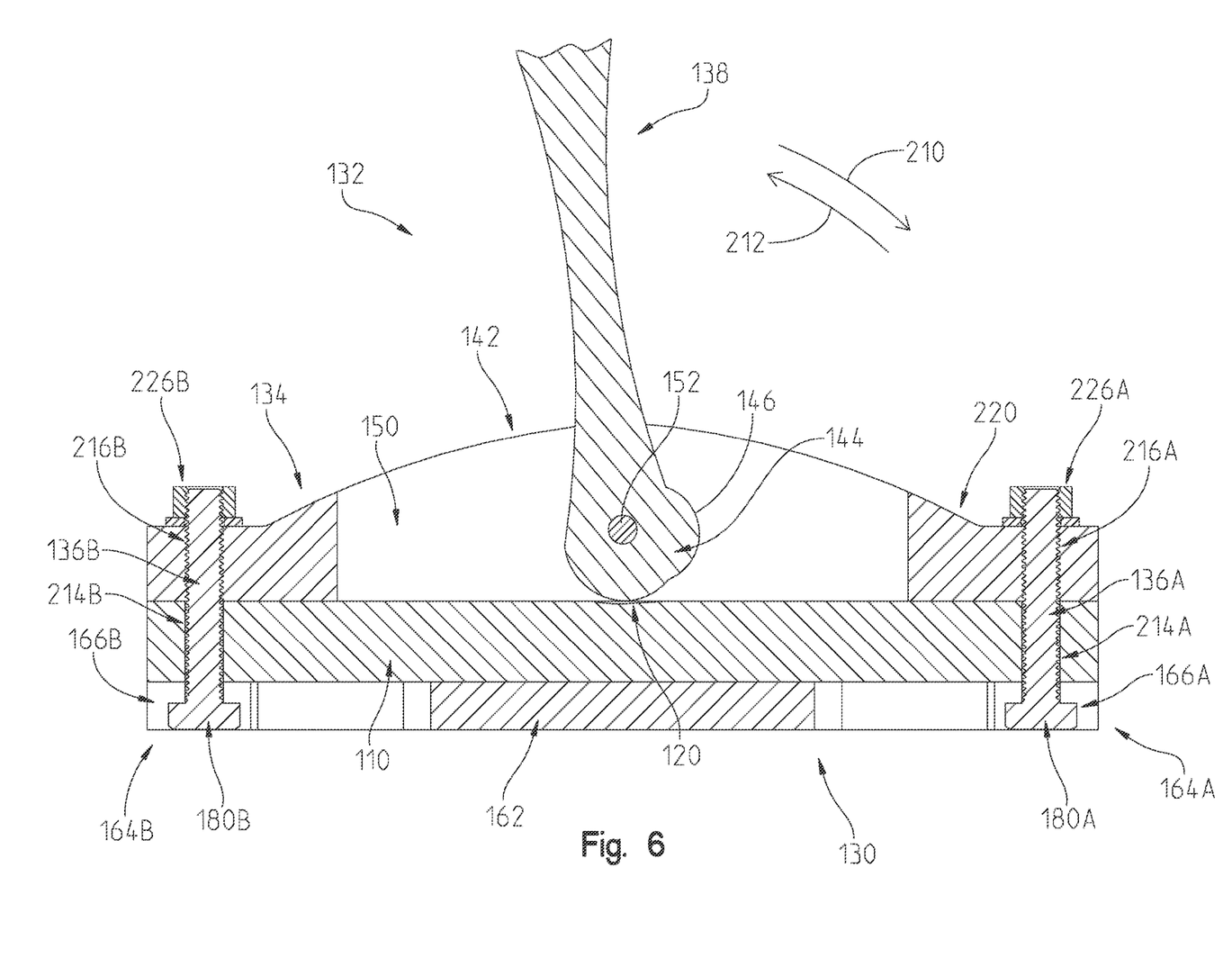
FIG. 6 illustrates a sectional view along lines 6-6 in FIG. 1 of the accessory in the locked configuration.

Accessory 100 further includes a slider 130 (see FIG. 3) which is received in guide recess 14 (see FIG. 1). Referring to FIG. 4, slider 130 is coupled to body 110 and a mechanical actuator 132. Mechanical actuator 132 includes a base 134, couplers 136A,B, and an input 138. Input 138 includes a first end having an operator input 140, illustratively a handle, and a second end 142 having a cam member 144 with a cam surface 146. Cam member 144 is received in an opening 150 in base 134. Input 138 is rotatably coupled to base 134 with a pin 152. Referring to FIG. 6, the location of pin 152 is between coupler 136A and coupler 136B.

Referring to FIG. 4, slider 160 includes a body portion 162, a lock 164A and a lock 164B. Referring to FIG. 9, each of locks 164A,B include a first slider 166A,B and a second slider 168A,B. Each of sliders 166A,B and sliders 168A,B are connected to body portion 162 at first ends 170A,B and are spaced apart at second ends 172A,B. Sliders 166A,B have recesses 174A,B and sliders 168A,B have recesses 176A,B. Respective recesses 174A,B and 176A,B are sized and shaped to receive a first end 180A,B of couplers 136A,B (see FIG. 3). Each of recesses 174A,B include a chamfered surface 182A,B (see FIGS. 7 and 8) and each of recesses 176A,B include a chamfered surface 184A,B.

Figure 2:
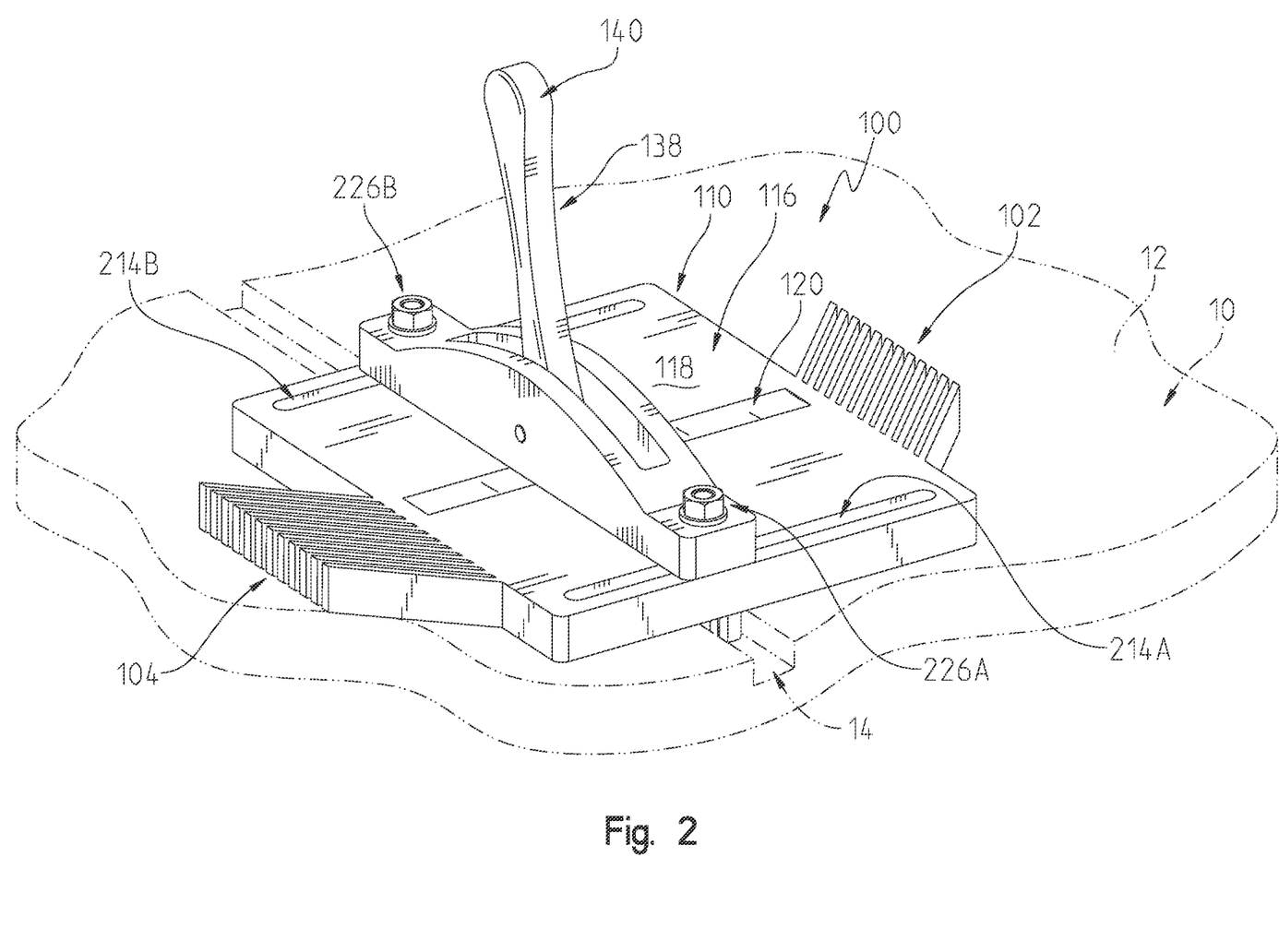
FIG. 2 illustrates the accessory of FIG. 1 in an unlocked configuration relative to the woodworking support.
Figure 7:
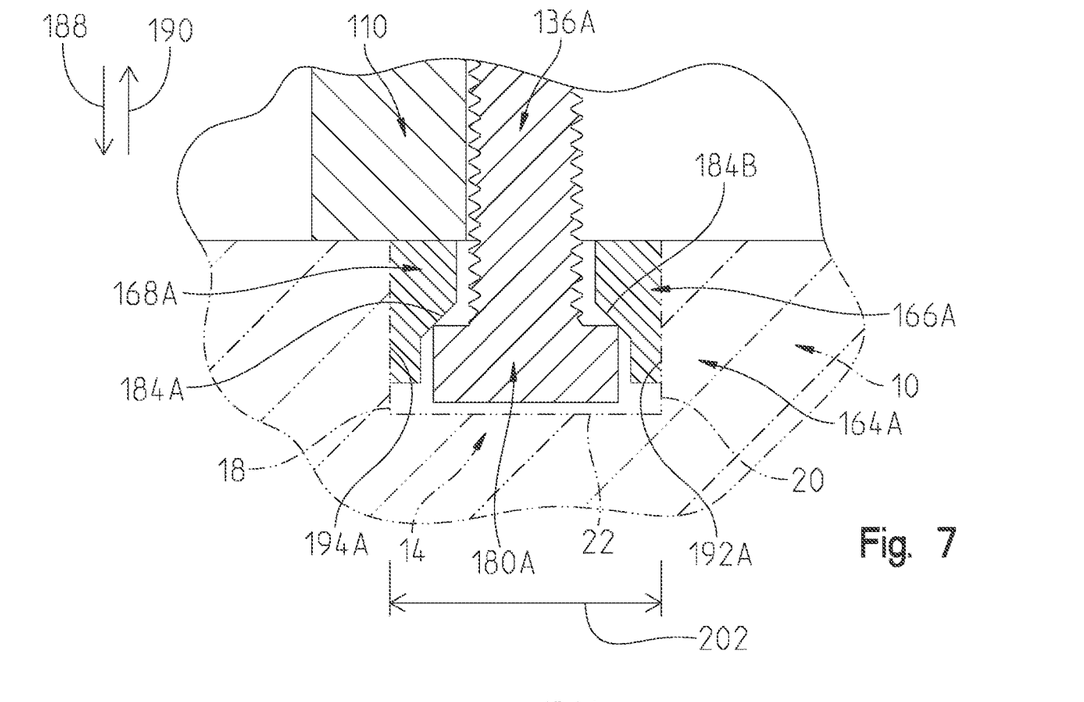
FIG. 7 illustrates a sectional view along lines 7-7 in FIG. 2 of the accessory in the unlocked configuration.
Figure 8:
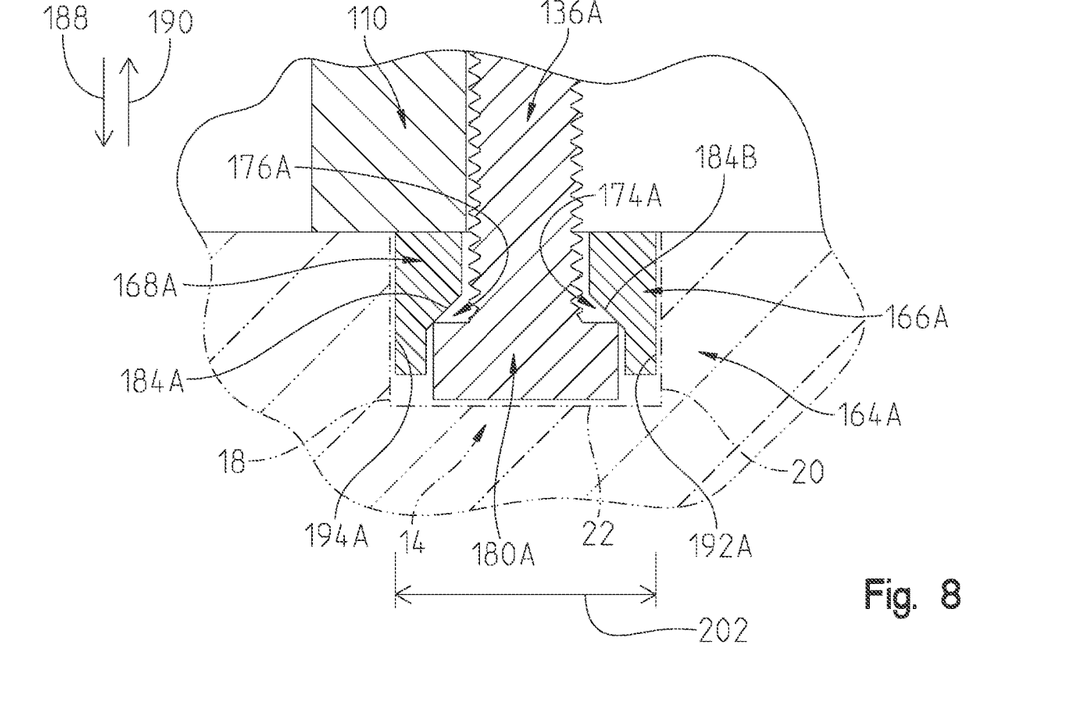
FIG. 8 illustrates a sectional view along lines 8-8 in FIG. 2 of the accessory in the unlocked configuration.
Figure 9:
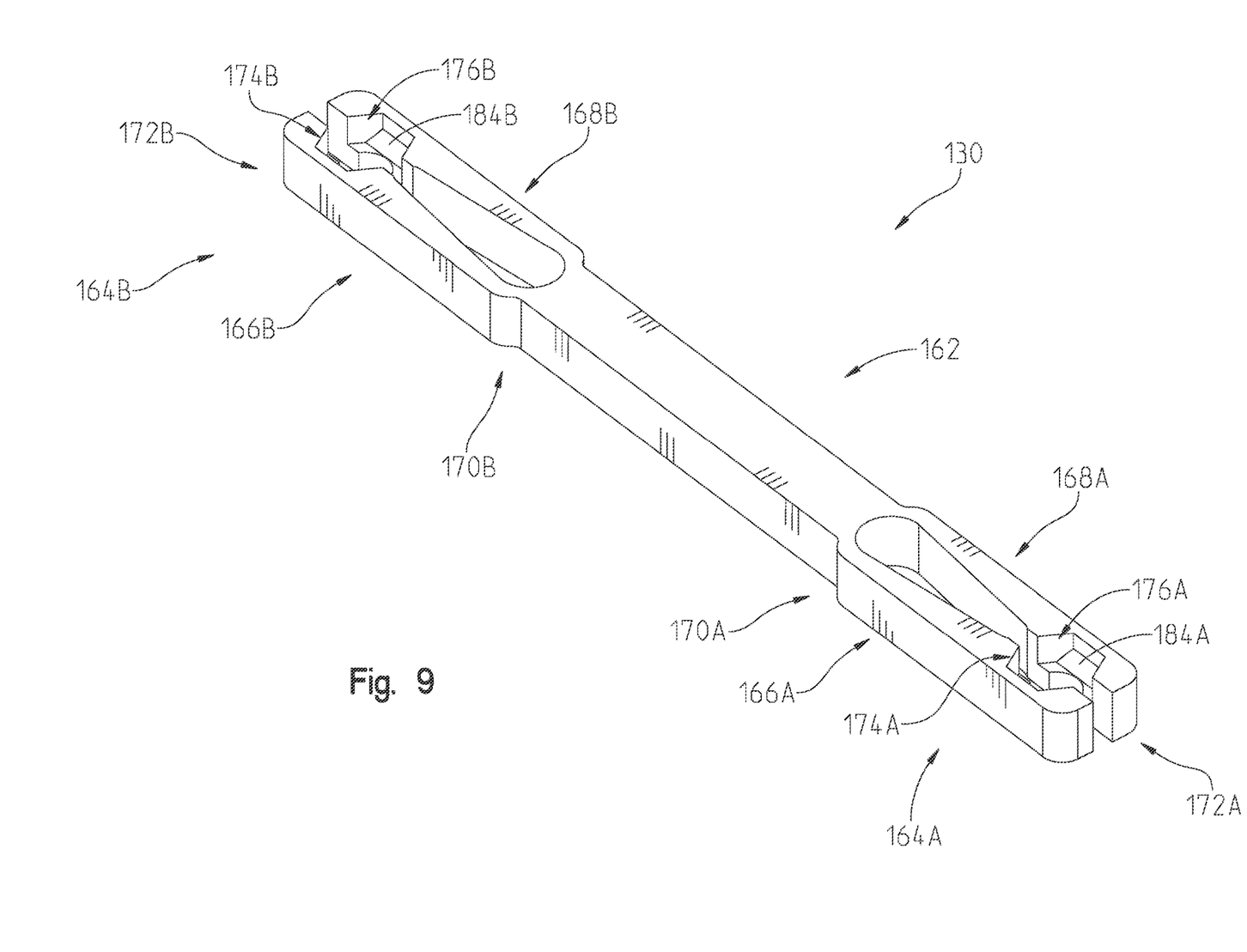
FIG. 9 illustrates a lower perspective view of a slider of the accessory of FIG. 1.

Referring to FIGS. 7 and 8, couplers 136A,B are movable vertically in direction 188 and direction 190. In FIG. 7, coupler 136A has been moved upward in direction 190, relative to the position of coupler 136A in FIG. 8. As coupler 136A moves in direction 190, first end 180A of coupler 136A moves upward along chamfered surface 182A of first slider 166A and chamfered surface 184A of second slider 168A causing first slider 166A and second slider 168A to further separate. As shown in FIG. 8, when first end 180A is lowered in direction 188 an outer side 192A of first slider 166A is spaced apart from second side wall 20 of guide recess 14 of woodworking support 10 and an outer side 194A of second slider 168A is spaced apart from first side wall 18 of guide recess 14 of woodworking support 10. This spacing permits movement of accessory 100 in direction 196 and direction 198 along guide recess axis 16 of guide recess 14 (see FIG. 2). As shown in FIG. 7, when first end 180A is raised in direction 190 outer side 192A of first slider 166A presses against second side wall 20 of guide recess 14 of woodworking support 10 and outer side 194A of second slider 168A presses against first side wall 18 of guide recess 14 of woodworking support 10. The frictional force exerted by first slider 166A and second slider 168A on first side wall 18 and second side wall 20 of guide recess 14 prevents movement of accessory 100 in direction 196 and direction 198 along guide recess axis 16 of guide recess 14 (see FIG. 1).

Locks 164A,B have an unlocked arrangement having a first width 200 (see FIG. 8) and a locked arrangement having a second width 202 (see FIG. 7), the second width 202 being greater than the first width 200. Each of first width 200 and second width 202 being a width measurement from an outer side 192A of first slider 166A of lock 164A to an outer side 194A of second slider 168A of lock 164A.

Figure 5:
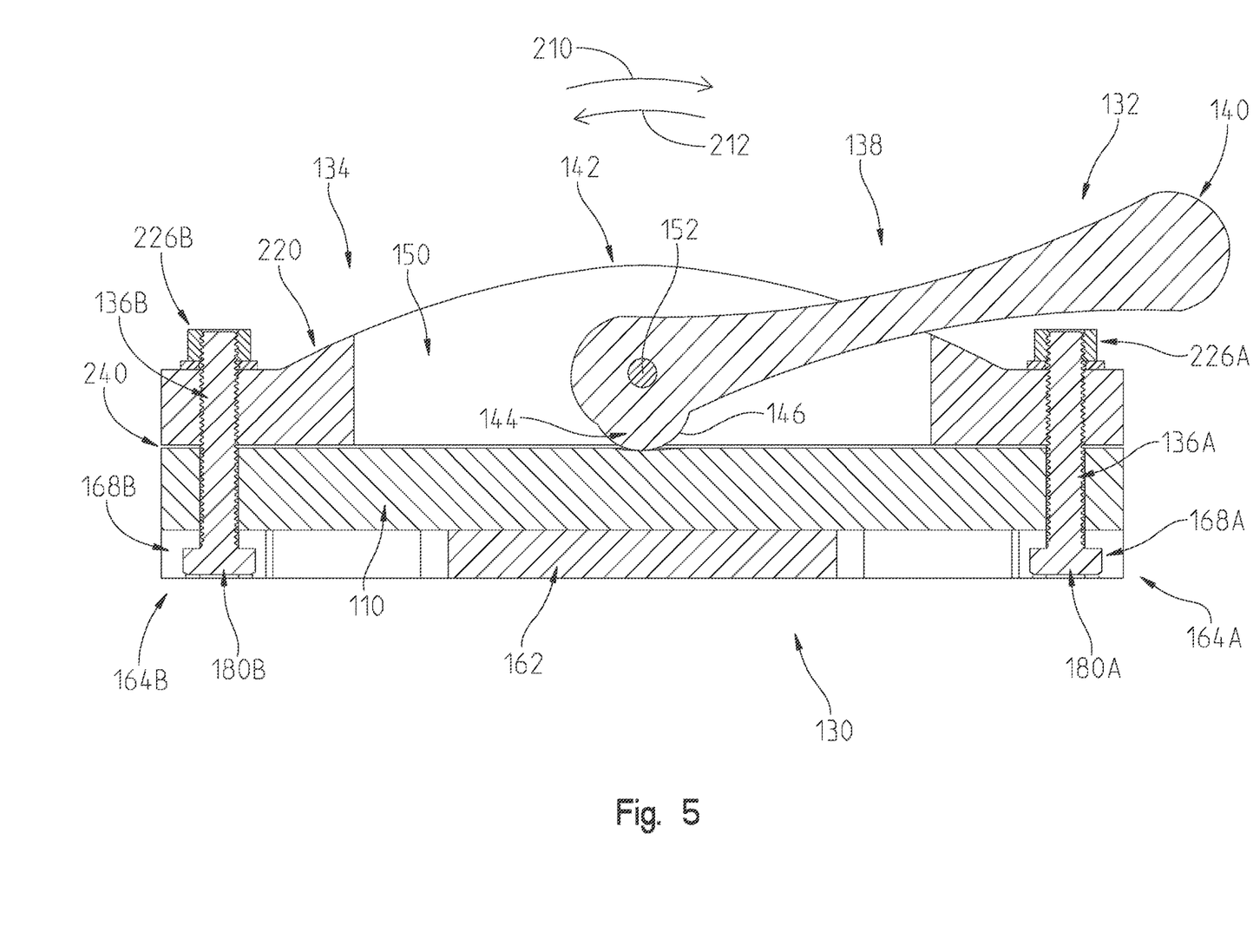
FIG. 5 illustrates a sectional view along lines 5-5 in FIG. 1 of the accessory in the locked configuration.

FIG. 5, like FIG. 7, corresponds to lock 164A and lock 164B being in the locked arrangement and FIG. 6, like FIG. 8, corresponds to lock 164A and lock 164B being in the unlocked arrangement. Referring to FIGS. 5 and 6, input 138 is rotated in direction 212 to place mechanical actuator 132 in the unlocked arrangement (FIG. 6) and is rotated in direction 210 to place mechanical actuator 132 in the locked arrangement (FIG. 5).

Referring to FIG. 6, couplers 136A,B are received in elongated slots 214A,B of body 110 and openings 216A,B of base 134. A second end 218A,B of couplers 136A,B extend above an upper side 220 of base 134. In embodiments, couplers 136A,B are adjustable to alter the first width 200 and second width 202 of lock 164A and lock 164B. In the illustrated embodiment, couplers 136A,B are threaded bolts which are threadably engaged with respective nuts 226A,B. By threading nuts 226A,B further onto the threaded bolts of couplers 136A,B an overall length of couplers 136A,B from first end 180A,B to nuts 226A,B is shortened which results in first width 200 and second width 202 being wider compared to when the overall length of couplers 136A,B is longer.

When lock 164A and lock 164B are in an unlocked arrangement (see FIGS. 6 and 8), slider 130 may slid within guide recess 14 of woodworking support 10 in direction 196 and direction 198 and be removed from guide recess 14 of woodworking support 10. Further, body 110 may be moved relative to base 134 in direction 230 and direction 232 (see FIG. 2) which are along the longitudinal axis of elongated slots 214A,B. Therefore, a distance between first featherboard 102 and cutting device 30 may be adjusted.

An operator grasps operator input 140 of input 138 and rotates input 138 in direction 210 to transition lock 164A and lock 164B from an unlocked arrangement to a locked arrangement. Comparing FIGS. 5 and 6, as the input 138 is rotated in direction 210, cam surface 146 of cam member 144 presses against guide recess 120 of body 110 and due to further rotation raises base 134 relative to body 110 to provide a gap 240 (see FIG. 5). This in turn raises first end 180A of couplers 136A and first end 180B of coupler 136B which causes lock 164A and lock 164B to transition from the unlocked arrangement of FIG. 8 to the locked arrangement of FIG. 6. Further, input 138 by pressing against body 110 holds body 110 relative to base 134 and presses body 110 against upper surface 12 of woodworking support 10 to hold body 110 relative to woodworking support 10.

In embodiments, mechanical actuator 132 simultaneously actuates each of lock 164A from the unlocked arrangement to the locked arrangement and lock 164B from the unlocked arrangement to the locked arrangement when input 138 is moved from the position in FIG. 6 to the position in FIG. 5. Further, mechanical actuator 132 simultaneously actuates each of lock 164A from the locked arrangement to the unlocked arrangement and lock 164B from the locked arrangement to the unlocked arrangement when the actuator is moved from the position in FIG. 5 to the position in FIG. 6.

In an exemplary method of securing accessory 100 to woodworking support 10 having upper surface 12 and guide recess 14, the method comprises the steps of placing lock 164A of accessory 100 in guide recess 14, lock 164A being in an unlocked arrangement; placing lock 164B of accessory 100 in guide recess 14, lock 164B being in an unlocked arrangement; positioning body 110 of accessory 100 against upper surface 12 of woodworking support 10; positioning accessory 100 relative to cutting device 30; and locking accessory 100 in place relative to woodworking support 10 with a single actuator, mechanical actuator 132, that places both lock 164A in a locked arrangement and lock 164B in a locked arrangement. In examples, accessory 100 includes first featherboard 102. In examples, the step of positioning accessory 100 relative to cutting device 30 includes the steps of: moving accessory 100 relative to cutting device 30 along guide recess axis 16 of guide recess 14; and moving body 110 of accessory 100 relative to cutting device 30 along a direction, such as direction 230 or direction 232, angled relative to guide recess axis 16 of guide recess 14 while lock 164A and lock 164B remain in guide recess 14. In examples, the method further comprises the step of locking body 110 of accessory 100 in place relative to woodworking support 10 along the direction, such as direction 230 or direction 232, angled relative to guide recess axis 16 of guide recess 14 with mechanical actuator 132. In examples, the steps of locking accessory 100 in place relative to woodworking support 10 with mechanical actuator 132 that places both lock 164A in the locked arrangement and lock 164B in the locked arrangement and locking body 110 of accessory 100 in place relative to woodworking support 10 along the direction, such as direction 230 or direction 232, angled relative to guide recess axis 16 of woodworking support 10 with mechanical actuator 132 are performed with a first actuation of mechanical actuator 132, such as the rotation of input 138 in direction 210 from the position in FIG. 6 to the position in FIG. 5.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An accessory for a woodworking support having a support surface and a guide recess, the accessory comprising:
    a body adapted to be supported on the support surface of the woodworking support, the body having a bottom side and a top side, the top side being opposite the bottom side;
    a first lock adapted to be positioned in the guide recess of the woodworking support, the first lock having an unlocked arrangement having a first width and a locked arrangement having a second width, the second width being greater than the first width;
    a second lock adapted to positioned in the guide recess of the woodworking support, the second lock having an unlocked arrangement having a third width and a locked arrangement having a fourth width, the fourth width being greater than the third width; and
    a mechanical actuator having an operator input positionable in a first position wherein the first lock is in the unlocked arrangement having the first width and the second lock is in the unlocked arrangement having the third width and a second position wherein the first lock is in the locked arrangement having the second width and the second lock is in the locked arrangement having the fourth width;
    wherein the mechanical actuator includes a base, a first coupler coupling the first lock to the base at a first location, a second coupler coupling the second lock to the base at a second location, and a cam member rotatably coupled to the base at a third location, the third location being between the first location and the second location.

2. The accessory of claim 1, wherein the mechanical actuator simultaneously actuates each of the first lock from the unlocked arrangement to the locked arrangement and the second lock from the unlocked arrangement to the locked arrangement when the actuator is moved from the first position to the second position.

3. The accessory of claim 2 wherein the mechanical actuator simultaneously actuates each of the first lock from the locked arrangement to the unlocked arrangement and the second lock from the locked arrangement to the unlocked arrangement when the actuator is moved from the second position to the first position.

4. The accessory of claim 1, wherein the mechanical actuator simultaneously actuates each of the first lock from the locked arrangement to the unlocked arrangement and the second lock from the locked arrangement to the unlocked arrangement when the actuator is moved from the second position to the first position.

5. The accessory of claim 1, wherein the cam actuates each of the first lock from the unlocked arrangement to the locked arrangement and the second lock from the unlocked arrangement to the locked arrangement when the actuator is moved from the first position to the second position.

6. The accessory of claim 1, wherein the base is supported by the body and is vertically raised relative to the body when the first lock is in the locked arrangement and the second lock is in the locked arrangement.

7. The accessory of claim 6, wherein a movement of the cam member vertically raises the base relative to the body.

8. The accessory of claim 7, wherein the cam member contacts the body when the first lock is in the locked arrangement and the second lock is in the locked arrangement.

9. The accessory of claim 6, wherein the first lock includes a first slider and a second slider separated from the first slider by a first amount when the first lock is in the unlocked arrangement having the first width and by a second amount when the first lock is in the locked arrangement having a second width.

10. The accessory of claim 9, wherein the first coupler includes a first portion positioned between the first slider and the second slider, the first portion of the first coupler having a first vertical position when the first lock is in the unlocked arrangement and a second vertical position when the first lock is in the locked arrangement, the second vertical position being closer to the body than the first vertical position.

11. The accessory of claim 10, wherein the first coupler is adjustable to set a value for the second amount.

12. The accessory of claim 11, wherein the first lock and the second lock are part of an integral slider.

13. The accessory of claim 1, wherein the body includes a first elongated slot and a second elongated slot, the first coupler passing through the first elongated slot of the body and having a first end coupled to the first lock and a second end coupled to the base of the mechanical actuator and the second coupler passing through the second elongated slot of the body and having a first end coupled to the second lock and a second end coupled to the base of the mechanical actuator.

14. The accessory of claim 13, wherein the body is moveable relative to the base when the first lock is in the unlocked arrangement and the second lock is in the unlocked arrangement and is fixed relative to the base when the first lock is in the locked arrangement and the second lock is in the locked arrangement.

15. The accessory of claim 1, wherein the accessory includes a featherboard.

* * * * *